United States Patent [19]

McCarty et al.

[11] Patent Number: 5,282,719
[45] Date of Patent: Feb. 1, 1994

[54] QUAD MODE FAN PITCH ACTUATION SYSTEM FOR A GAS TURBINE ENGINE

[75] Inventors: Frederick B. McCarty, San Pedro; Thomas F. Fitzgibbon, Long Beach, both of Calif.

[73] Assignee: AlliedSignal Inc., Morris Township, Morris County, N.J.

[21] Appl. No.: 700,385

[22] Filed: May 13, 1991

[51] Int. Cl.$^5$ .......................................... B64C 11/44
[52] U.S. Cl. ........................................ 416/1; 416/144; 416/152; 416/155; 416/162; 416/165; 74/89.15; 74/841; 475/5; 475/150
[58] Field of Search ................. 416/1, 26, 32, 144, 416/151, 152, 155, 160, 162, 165; 74/89.15, 841; 425/1, 5, 150

[56] References Cited

U.S. PATENT DOCUMENTS

| | | |
|---|---|---|
| 2,314,025 | 3/1943 | Waseige ........................... 416/151 |
| 2,370,135 | 2/1945 | Berliner . |
| 2,488,392 | 11/1949 | Forsyth . |
| 2,612,228 | 9/1952 | Forsyth . |
| 2,711,796 | 6/1955 | Amiot ............................... 416/152 |
| 3,601,499 | 8/1971 | Ellinger ............................ 416/160 |
| 3,866,415 | 2/1975 | Ciokajilo . |
| 3,900,274 | 8/1975 | Johnston et al. . |
| 3,904,315 | 9/1975 | Schwartz . |
| 3,922,852 | 12/1975 | Drabek . |
| 3,994,128 | 11/1976 | Griswold, Jr. et al. . |
| 4,021,142 | 5/1977 | Violette . |
| 4,047,842 | 9/1977 | Avena et al. ..................... 416/152 |
| 4,061,440 | 12/1977 | Belliere . |
| 4,124,330 | 11/1978 | Barnes . |
| 4,578,019 | 3/1986 | Safarik ............................. 416/151 |
| 4,591,313 | 5/1986 | Miyatake et al. ................ 416/165 |
| 4,753,572 | 6/1988 | Kusiak ............................. 416/160 |
| 4,968,217 | 11/1990 | Newton ........................... 416/160 |

FOREIGN PATENT DOCUMENTS

| | | |
|---|---|---|
| 712882 | 11/1943 | Fed. Rep. of Germany . |
| 3406634 | 2/1984 | Fed. Rep. of Germany . |
| 12595 | of 1908 | United Kingdom ............ 416/165 |
| 1368282 | 9/1974 | United Kingdom ............ 416/145 |

Primary Examiner—Edward K. Look
Assistant Examiner—James A. Larson
Attorney, Agent, or Firm—Hugh P. Gortler; Robert A. Walsh

[57] ABSTRACT

Blade pitch is changed by an actuator that is responsive to the relative rotation of two input members. Blade pitch is not changed when the members are rotated at the same speed. However, blade pitch is changed in one direction when a braking torque is applied to one member, and blade pitch is changed in an opposite direction when a braking torque is applied to the other member.

17 Claims, 7 Drawing Sheets

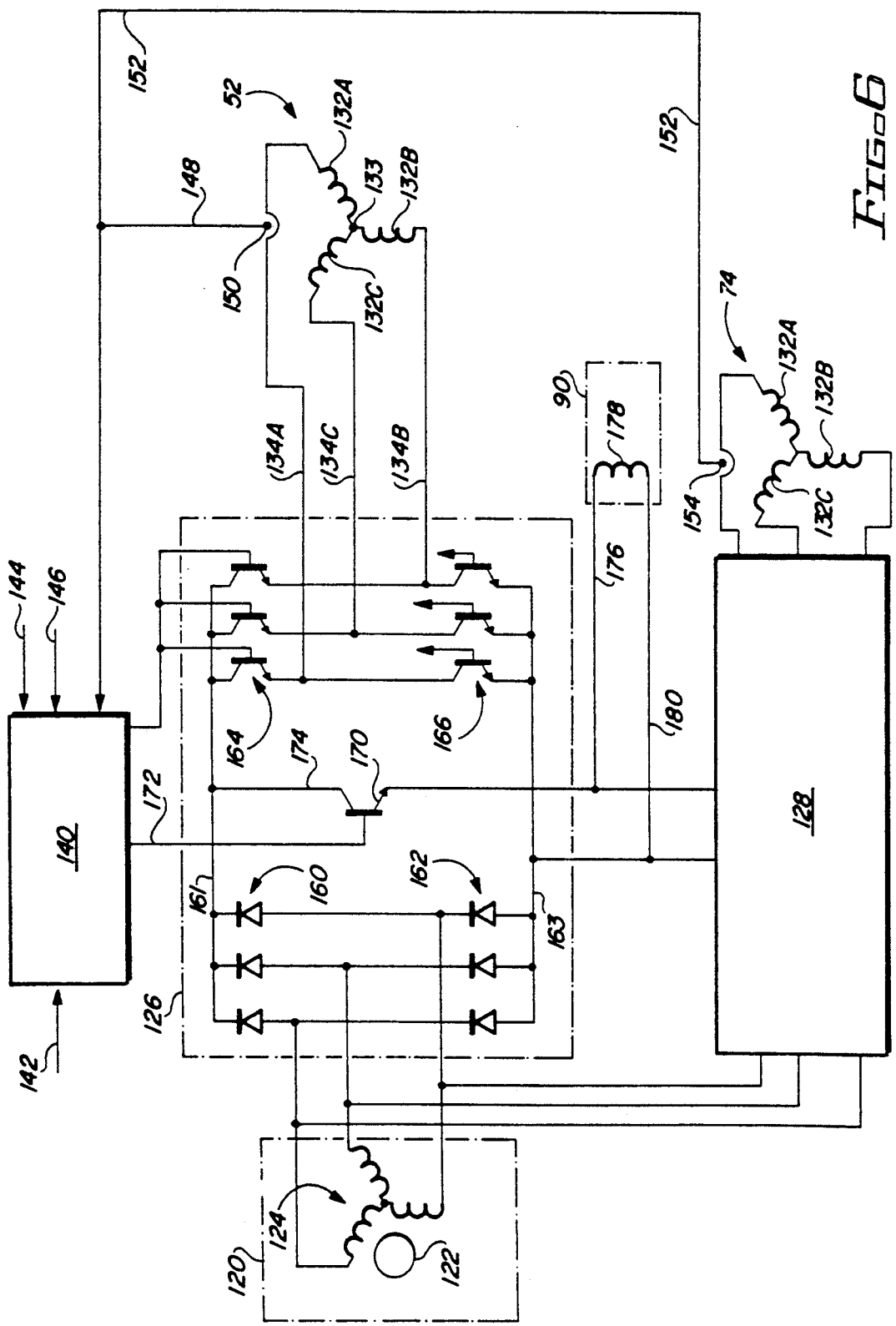

QUAD MODE FAN PITCH ACTUATION SYSTEM FOR A GAS TURBINE ENGINE

FIELD OF THE INVENTION

This invention relates to a variable pitch fan for a gas turbine engine and, more particularly, to a quad mode actuation system having four potential operating states to control a variable pitch fan of a gas turbine engine of the high-bypass fan type.

DESCRIPTION OF THE PRIOR ART

Manufacturers who provide gas turbines for powering aircraft are constantly engaged in finding ways to improve the efficiency of such gas turbines so that greater thrust is available for powering the aircraft at little or no increase in weight in the gas turbine itself. One way to accomplish this result by using a gas turbine having a core engine and a fan driven by the core engine. A portion of the air passing through the fan is ducted into the engine core while the remaining airflow is bypassed around the engine core. These types of engines are commonly referred to as high bypass turbo-fan engines. Further efficiency is obtained by providing the fan of the high bypass turbofan engine with variable pitch fan blades so that the flow characteristics of the fan may be varied in order to optimize fan operation at all modes of flight of the aircraft. Variable fan blade pitch capability during flight can potentially increase the available thrust from a turbofan engine by as much as twenty percent, thereby providing the required increased power capability. Accordingly, a variable pitch thrust fan is highly desirable to several turbofan engine manufacturers.

The new family of large diameter, high bypass turbofan engines recently introduced into airline service have proved to be an economical and convenient means of propulsion for today's wide bodied aircraft which cruise subsonically. The high bypass engines have also demonstrated noise levels which are significantly lower than those of previous generation engines due to the reduced jet velocities of the airflow pressurized by the fan while thrust levels have been increased as a direct result of the increased airflow mass passing through the fan. Even further increases in performance efficiency could be obtained if the effective fan speed of these large high bypass turbofan engines could be varied to meet different engine operating requirements during the flight.

One means of varying the fan speed of a bypass turbofan engine without changing the rotational speed of the core engine is through the use of variable pitch fan blades. The fan blade pitch may be varied to cater to varying flight conditions and may even be varied to reverse pitch for complete thrust reversal after landing. Despite the advantages, variable pitch fan blades have not proven satisfactory when considered for the earlier generation of smaller fan fan engines due to the high centrifugal forces under which the variable pitch fan blades must be actuated.

The use of hydraulic actuators for providing the necessary actuation force has been considered in the prior art. However, a severe problem encountered when using hydraulic actuators is the danger of leakage if the integrity of the hydraulic system is not maintained or sealing is faulty and hydraulic fluid enters the interior of the gas turbine and is exposed to the high temperatures present there. The leakage of hydraulic fluid presents the danger of a fire in the gas turbine which can either spread to the aircraft in which the gas turbine is mounted or cause a malfunction of the gas turbine and therefore a degradation of the amount of propulsive force supplied to the aircraft. This can be serious in the normal flight mode and particularly so in those flight modes, such as take-off and landing, where power is critical. In addition, the leakage of even small amounts of hydraulic fluid can contaminate the bleed air taken from the engine which air is used to provide pressurized fresh air to the aircraft cabin. Accordingly, it would be preferable to eliminate the use of hydraulic actuators for activating the variable pitch fan of a gas turbine engine.

Providing a pitch-change apparatus for a ducted, high by-pass thrust fan is complicated by several other factors. The apparatus should be light-weight and compact since it will be mounted in the fan hub. The hub rotates at high speed to obtain the required high by-pass and pressure ratios. Thus, centrifugal stress and strain are severe. The large number of blades in close proximity to one another at the hub and the blade angles through which each blade must be turned place stringent requirements on the size of the apparatus and the magnitude of the displacements and forces produced by the apparatus.

In addition, consideration is being given to using the variable pitch fan for this next generation fan propulsion turbine engine to produce reverse thrust during landings. This would replace conventional thrust reversal systems and thus eliminate the weight, complexity and unreliability they incur.

SUMMARY OF THE INVENTION

A quad mode differential induction actuator can provide four modes of operation: (1) a differential brake mode for fan blade pitch control on a running engine, (2) a differential motor mode for pitch control on a stopped or non-rotating engine, (3) a dual motor mode for starting the engine, and (4) a dual generator mode for electric power generation. The quad mode actuation system can be used with various types of aircraft engines, including turbo-fan, fan-jet, and turbo-prop engines. It is applicable to ducted and unducted fans. For clarity in the presentation herein, the quad mode actuation system will be detailed and described for an application in a high by-pass turbo-fan engine.

The quad mode actuator comprises gear means for linking a turbine shaft to a plurality of blades. The gear means is responsive to relative rotation of two members. Blade pitch is changed when the members are rotated at different speeds, and it is not changed when the members are rotated at the same speed. Actuator means operate on the members to cause the relative rotation.

The gear means includes differential reduction gears, and the actuator means includes an induction motor for each member. Each induction motor includes a rotor and a stator.

DESCRIPTION OF QUAD MODES OF OPERATION

The induction motors can drive the pitch of a turbofan engine's fan blades to any desired position while the engine is running. However, three other modes of operation of the systems may be selected simply by altering the excitation currents supplied to the stator windings of the two induction motors.

In the first mode of operation, pitch is changed to match flight conditions and optimize engine performance. Actuation power is extracted from the turbine shaft, whereby engine torque is directed to the differential reduction gear means by simply exciting the field of one of the induction stators with a direct current. Fan blade pitch will increase or decrease, depending on which stator is excited. Because the induction rotors are mechanically connected through a differential drive, one rotor is sped up when the other rotor is slowed down. This difference in the rotor speeds is what drives the pitch changing gears for the fan blades. A particular advantage of this double brake rotor action is that the inertia torque is symmetrical for a pitch change in either direction.

The differential reduction gears provide a large ratation for torque amplification which is beneficial due to the wind load on the fan blades at maximum speed. Also, large friction forces due to centrifugal loads on bearings located at the root of each blade must be overcome during a pitch change. If overall gear efficiency is less than fifty-percent, the fan blades generally cannot back-drive the rotors. Therefore, unexcited rotors will continuously spin in synchronism with the engine shaft, the fan blades, and with each other. When all parts are in synchronism or locked, there is virtually no wear on the bearings or the gears because of the absence of rolling or sliding motion. Only wear associated with vibration, and the relatively infrequent pitch changes, need to be accommodated.

In the second mode of operation, pitch is changed when the engine is not running. The stators of the induction motors are excited by three phase AC current of such frequency and sequence that the brake rotors will move at different speeds due to differential induction motor action. The speed difference between the two rotors drives the blades to a desired pitch. One rotor will turn clockwise and the other will turn counter-clockwise. The power for driving the fan blades to a new pitch angle must be provided entirely from the AC electrical power applied to the stators. Generally the AC power required for pitch changing in this mode will be relatively low because the engine is not running; therefore the wind load on the blades is negligible as compared to when they are turning at maximum engine speed. It should be noted that differential motoring can also be obtained by exciting only one stator, but with a higher AC current than would be required using both stators.

In the third mode of operation, the actuator functions to provide engine starting capability. The two rotors are locked to the turbine shafts and the brake stators are excited by three phase AC current such that both rotors rotate together at the same speed in a direction to start rotation of the turbine shaft. With the torques on both rotors applied in the same direction, the engine shaft will turn, but the fan blade pitch will remain fixed since the rotor speeds are equal.

The AC power provided to the stator must be sufficient to drive the engine shaft above the speed of ignition, i.e., to a speed where sufficient acceleration torque is developed by the engine to reach rated speed. Since the engine is not running, power must be provided by a source such as a ground power supply, auxiliary power supply or battery. Power required to start the engine can be substantially reduced by first rotating the pitch of the fan blades to the feathered position.

In the fourth mode of operation, the actuator generates electrical power. When the engine is running, the brake rotors are locked to the turbine shaft. The stator windings of the induction motors are excited by three phase AC current such that both rotors move at a negative slip with respect to excitation of the stator windings. Although the fourth mode must be interrupted when a pitch change function is required, there are many applications for electrical power on the aircraft such as de-icing and air conditioning where occasional brief interruptions would not be a concern.

Further, the quad mode actuation system has the capability of driving the fan blades from a forward thrust position to a reverse thrust position during engine operation in a very brief time interval, i.e. within about three seconds following landing of the aircraft, to aid the stopping of the aircraft. Thus, other thrust reversing mechanisms can be eliminated.

BRIEF DESCRIPTION OF THE DRAWING FIGURES

FIG. 6 is an electrical schematic of the electronic control system and apparatus embodying the invention.

Figure 7A:
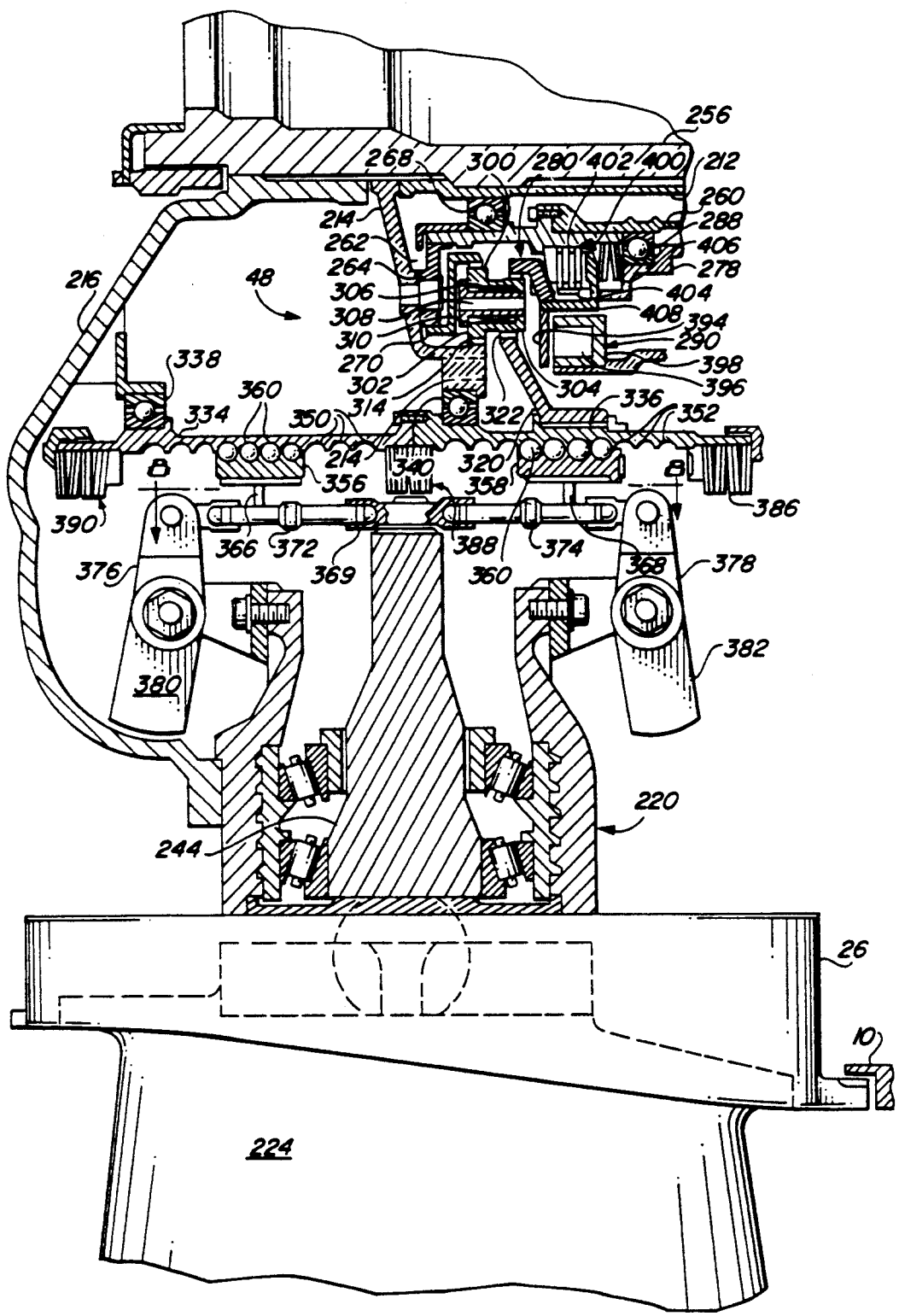
Figure 7B:
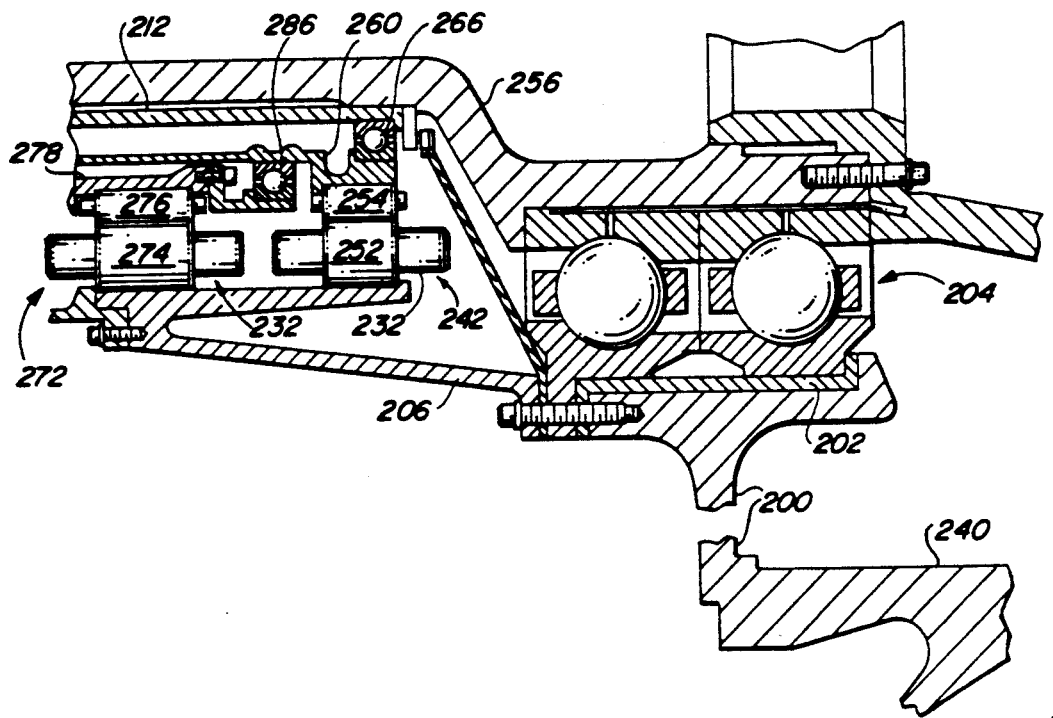
Figure 8:
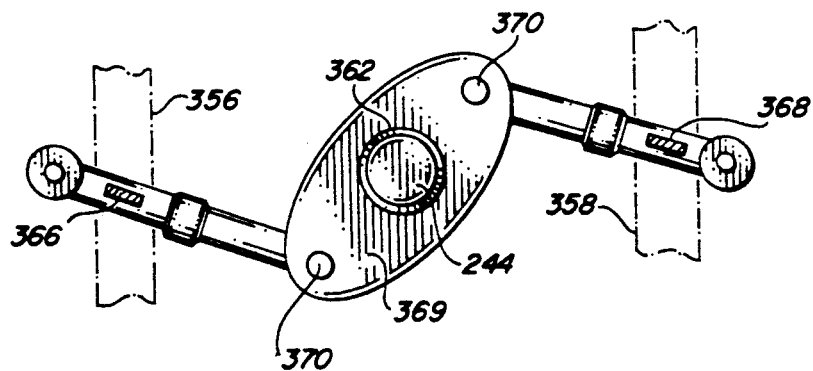

FIGS. 7A and 7B present detailed fragmentary longitudinal cross sectional views of the bidirectional induction brake actuator and linkage assembly; and FIG. 8 provides a partial cross sectional view along arrowed plane 8—8 of FIG. 7A.

DETAILED DESCRIPTION OF THE PREFERRED EMBODIMENT

Figure 1:
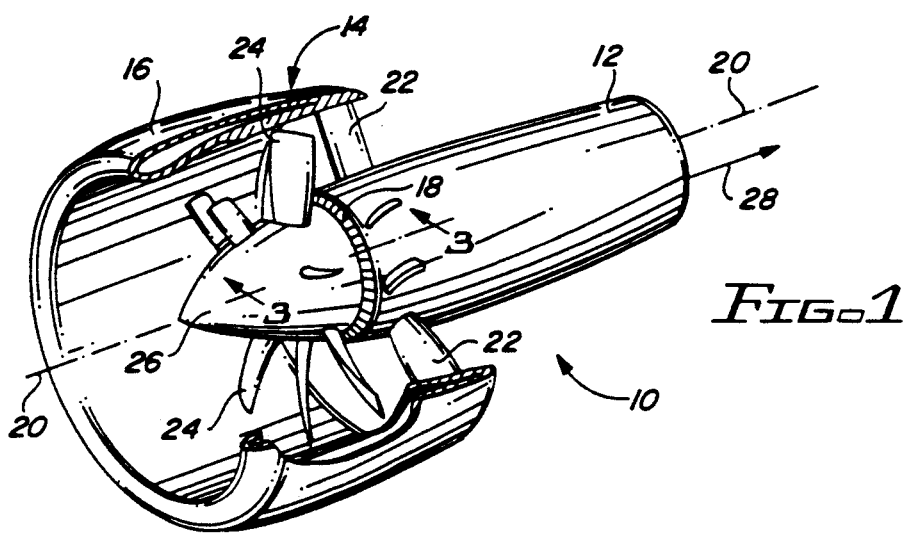
FIG. 1 is a perspective view of a propulsion turbine engine having a variable pitch fan section embodying the present invention.

FIG. 1 shows a turbofan engine unit of the type in which the pitch-change apparatus of the present invention is employed. The turbofan engine generally designated 10, has utility as an aircraft propulsor and has a turbine-type power plant 12 on which a thrust fan 14 and a by-pass duct 16 are mounted. The fan 14 is connected at the forward end of the turbofan engine 10 adjacent the compressor inlet 18 and is rotatably driven by the power plant (not detailed). The fan may be driven by a separate gas turbine in the engine or the fan may be driven jointly with the compressor.

The stationary by-pass duct 16 is supported over the fan 14 and is mounted coaxially of the hub and engine axis 20 by means of a series of stand-off struts 22 to provide an annular by-pass between the power plant 12 and the trailing portion of the duct. Variable pitch blades 24 of the fan 14 extend from the hub 26 into close proximity to the inside surface of the duct 16 to insure efficient displacement of air through the fan into both the compressor inlet 18 and the annular by-pass. The number of variable pitch blades 24 mounted on the hub 26 depends upon the size of the propulsion unit, and fans with a dozen or more blades are not uncommon. The power plant 12 includes a core engine flow path extending from inlet 18 to an aft exit, wherein the intake air is pressurized, mixed with fuel and combusted, and the combustion products are expanded through turbine means before the combustion products are exhausted via the aft exit, as generally indicated by arrow 28.

Conventionally, the power plant 12 of the turbofan engine 10 includes a compressor section inducting fan-pressurized ambient air via inlet 18, and discharging this air further pressurized to a combustor plenum. A combustor is located in the combustor plenum and receives a flow of fuel along with pressurized air to sustain combustion, providing a flow of high-temperature pressurized combustion products. The pressurized combustion products flow from the combustor to a turbine section for expansion toward ambient pressure. The turbine section extracts mechanical shaft power from the combustion products, and drives the thrust fan 14 via a shaft. In as much as the above described internal features of turbofan engine 10 are conventional and well-known to those skilled in the pertinent arts, they are not herein further depicted nor described.

Figure 2A:
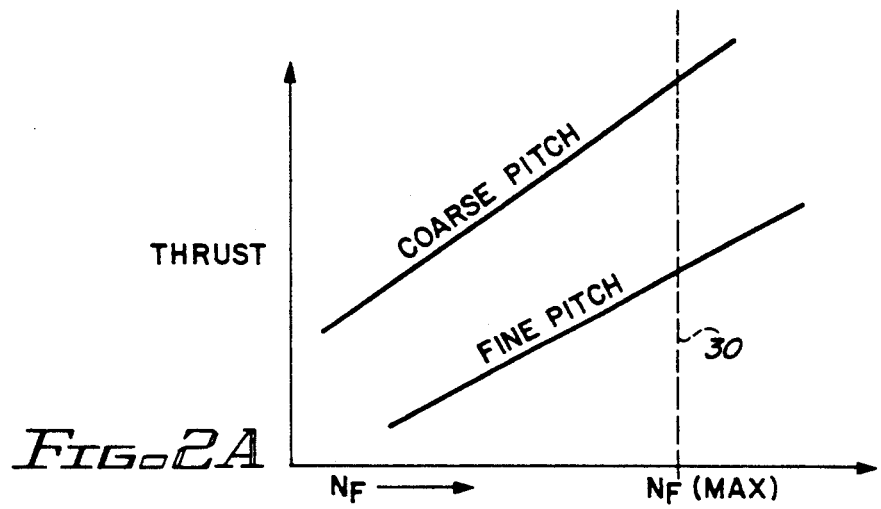
FIGS. 2A and 2B show the relationship between fan rotational speed and thrust produced by the fan for various pitch settings, and the relationship between flight speed and speed-specific thrust for various pitch settings.
Figure 2B:
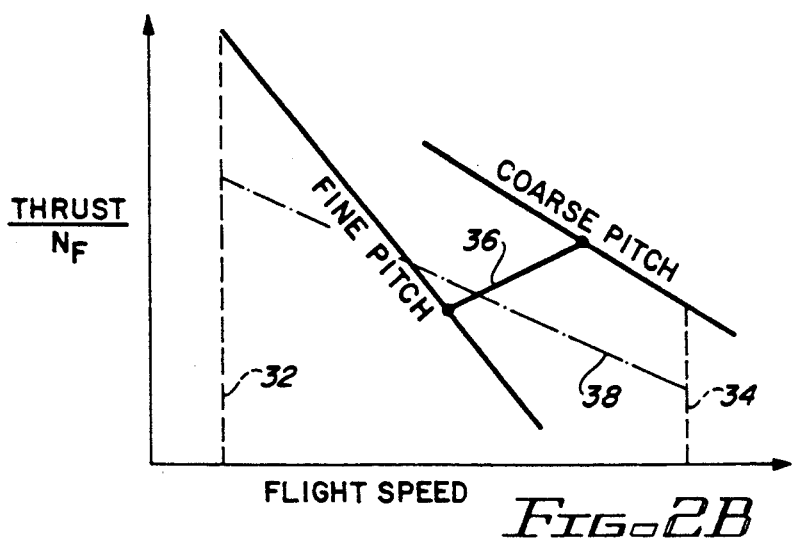

Turning now to FIGS. 2A and 2B, further background information in favor of the variable pitch fan thrust engine is graphically presented. FIG. 2A depicts the relationship between the rotational speed NF of the thrust fan 14 and the available thrust at an arbitrary forward speed. Generally, the arbitrary forward speed should be considered to be greater than zero speed, and the fan operation should be in a regime avoiding stalling of the fan blades 24. Thus, it is seen that at a limit value of NF, depicted by dashed line 30, a higher level of thrust may be obtained from the fan 14 if the blades 24 are set to a coarse pitch position.

During aircraft take off and low speed climbing operation of the turbofan engine 10, operation of the fan 14 in coarse pitch position could result in stalling of the blades 24, or in the power absorption of the fan exceeding the driving power available from the engine 12. FIG. 2B indicates at line 32 an exemplary take off and low speed climb condition of operation of the turbofan engine 10. As seen at line 32, the total thrust, considering the power plant 12 to be operating at NF (MAX), is greater with the blades 24 in a fine pitch position.

However, as aircraft altitude and flight speed increase towards a typical cruise condition (line 34 on FIG. 2B), the available thrust in the fine pitch position of blades 24 decreases markedly. Thus, change of the pitch position of blades 24 to a coarse pitch position (along line 36) is indicated as the aircraft continues to climb and accelerate. By way of comparison, phantom line 38 on FIG. 2B depicts the speed-specific thrust versus flight speed characteristic which might be expected from an otherwise comparable but conventional high bypass turbofan engine with a fixed-pitch fan. This engine will not provide as great a take off and acceleration thrust at low flight speeds (line 32). Nor will the conventional engine provide as great a cruise flight thrust. In order to provide the thrust required for an equal flight cruise speed, the conventional engine will necessarily be operated at a greater corrected speed. Understandably, the conventional engine will have a greater cruise thrust specific fuel consumption, which will result in a comparatively limited range for the aircraft.

Figure 3:
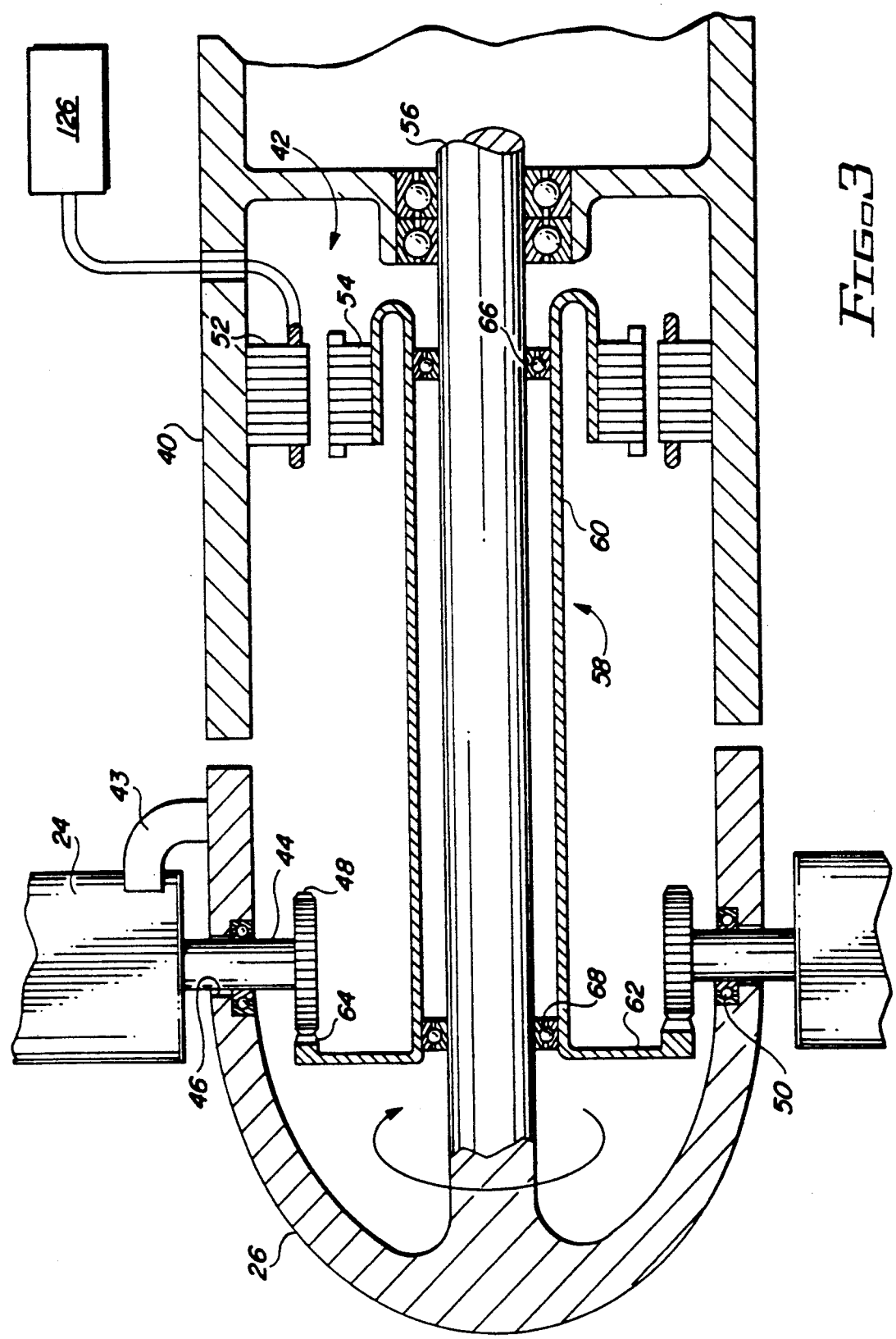
FIG. 3 is a simplified cross sectional view of the front portion of a propulsion unit including a uni-directional induction brake actuator.

FIG. 3 is a simplified axial cross sectional view of the front portion of the turbofan engine 10, including a stationary housing 40, which in addition to containing the power plant 12, also contains a uni-directional induction brake actuator 42. In FIG. 3, only two of the fan blades 24 are illustrated, it being understood that a plurality of the fan blades 24 are disposed about the hub 26. The root portion of the fan blade 24 is depicted as resting against a stop 43. The root 44 of fan blade 24 is generally cylindrical and extends through a hole 46 in the hub 26, terminating at a gear means 48. The root 44 of fan blade 24 is rotationally mounted and constrained by a bearing means 50 attached to the hub 26 in the holes 46 therein.

The uni-directional induction brake actuator 42 includes a stator 52 attached to the housing 40, as well as a brake rotor 54, which is normally turning synchronously with the hub 26 and blades 24 driven by an engine shaft 56. The brake rotor 54 is mechanically connected to a linkage means 58 which as depicted includes a tube 60 preferably coaxial with engine shaft 56, a disk section 62 and an annular ring gear 64 attached to the peripheral edge of the disk section 62. The linkage means 58, which is normally rotating with respect to the housing 40 during engine operation, is also relatively rotatable with respect to the engine shaft 56 during pitch change operation of the induction brake. Therefore bearings 66 and 68 are provided between the linkage means 58 and engine shaft 56.

In order to change the pitch angle of the fan blades 24 away from the blade stop 43, the stator 52 is excited with a DC current to electromagnetically induce a braking torque reaction between the stationary stator 52 and the brake rotor 54, causing the brake rotor 54 and linkage means 58 to slow down relative to the shaft 56. This braking torque is maintained until a precise number of slip revolutions have occurred to move the fan blades 24 to a desired new position (or until a second mechanical stop has been reached). Synchronous rotation of the brake rotor 54 with the engine shaft 56 then resumes indefinitely until a new fan blade pitch position is commanded.

Although a braking torque results when the stator 52 is energized with a DC excitation current, the power to move the fan blades 24 comes entirely from the engine shaft 56. The product of the braking torque multiplied by the speed of the stator 52 is always zero, so the stator 52 delivers no power, only a reaction torque. However, the product of the braking torque multiplied by the speed of the brake rotor 54 yields the actuation power extracted from the power plant 12 via the engine shaft 56. Part of this actuation power (torque multiplied by the speed of brake rotor relative to the engine shaft) moves the fan blades 24, while any remainder is dissipated as heat in the brake rotor 54.

Brake rotor 54 and its associated stator 52 of the brake actuator 42 could simply be mechanical brake components; however a mechanical brake would be subject to constant wear and performance degradation resulting in substantial maintenance. Thus, the induction brake actuator 42 is preferred because it can be very precisely controlled, and instead of torque from rubbing friction surfaces, the torque is produced by electromagnetic induction of current without wear in the brake rotor 54. The brake rotor 54 preferably has a rugged squirrel cage type configuration comprising a plurality of annular laminations and associated copper conductors. The stator 52 is preferably a multi-phase configuration including a plurality of windings disposed in an annular ferromagnetic toothed core assembly. Because the stator 52 is excited by a DC field, it is exactly analogous to a mechanical brake. The DC magnetic field is stationary in space; thus no electrical power is consumed in rotating the stator field, unlike an AC excited induction motor stator. The only electrical power consumed by the stator 52 is in the copper losses due to winding resistance. At this point it may be appreciated that when a pitch change is desired the application of the DC field to the stator 52 is the only input or signal transfer required to effectuate the pitch change. No other mechanical or electromagnetic coupling between the stationary components and the rotating components is required. However, the uni-directional induction brake actuator 42 of FIG. 3 is performance limited in that it can move the fan blades 24 in one direction only.

Figure 4:
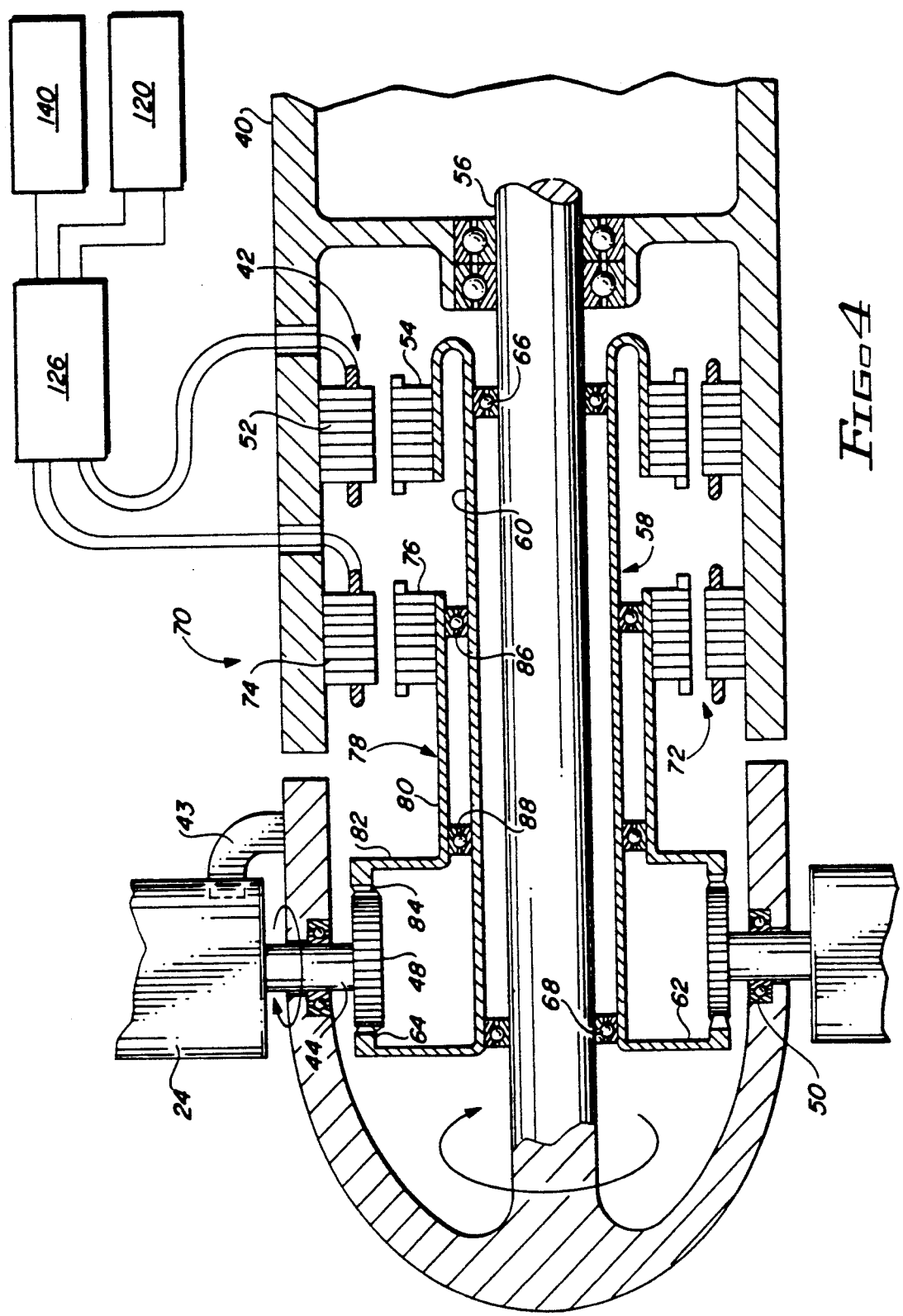
FIG. 4 is a simplified cross sectional view of the front portion of a propulsion unit including a bidirectional induction brake actuator.

FIG. 4 depicts a simplified cross sectional view of a bi-directional induction brake actuator 70 which further includes a second brake actuator 72 which is interconnected to brake actuator 42 in differential fashion. The second brake actuator 72 includes a second stator 74, mounted on the housing 40, and a second brake rotor 76 attached to linkage means 78 which interconnects the brake rotor and the gear means 48 of the fan blades 24. As depicted, the linkage means 78 includes a tube 80, disk 82, and annular gear 84. The annular gear 84 of the linkage means 78 engages the gear means 48 in a configuration oppositely disposed with respect to the annular gear 64 of linkage means 58. As depicted, the tube 60 of linkage means 58 and the tube 80 of linkage means 78 are both coaxially mounted with respect to the engine shaft 56, with tube 60 disposed within tube 80. The linkage means 78, which is normally rotating with respect to the housing 40 during engine operation, is also relatively rotatable with respect to the engine shaft 56 as well as to the linkage means 58 during pitch change operations. Bearings 86 and 88 are provided between the linkage means 78 and the linkage means 58.

In operation, when one of the two brake actuators 42, 72 is excited by an applied DC current, the excited brake rotor 54, 76 slows down with respect to the engine shaft 56. In addition, the other brake actuator, while unexcited, is driven ahead of the engine shaft 56 the same number of revolutions that the excited braked rotor drops behind, since the gear means 48 of the fan blades 24 is constrained in the hub 26. It should be noted that when one of the brake actuators 42, 72 is working and thus generating heat, the brake rotor 54, 76 of the respective unexcited brake actuator 42, 72 is unexcited and can thus cool down.

Figure 5:
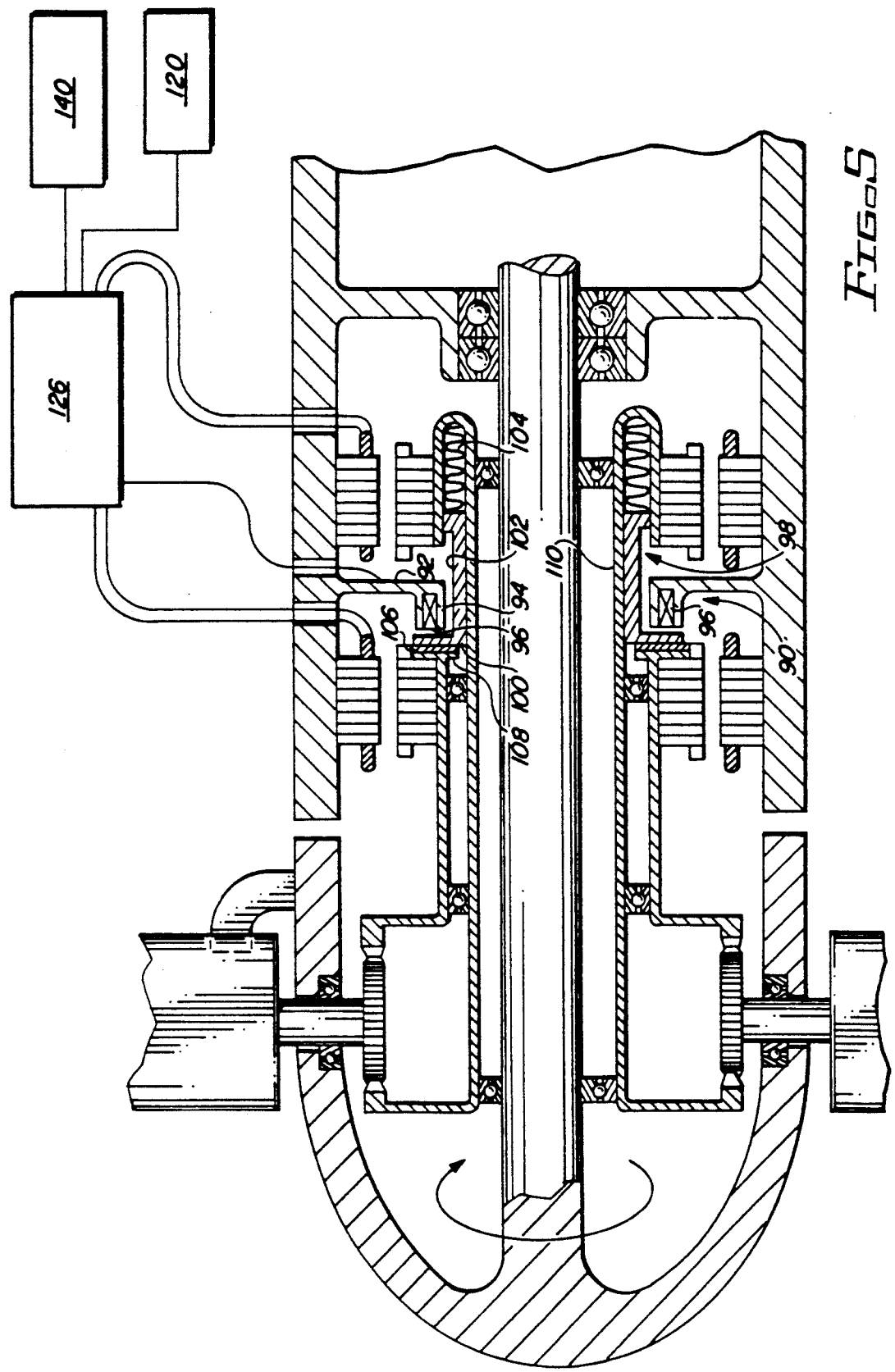
FIG. 5 is a simplified cross sectional view of the front portion of a propulsion unit including the bidirectional induction brake actuator of FIG. 4 and including a solenoid brake.

If the gear efficiency of the linkage means exceeds fifty percent, the torque forces exerted against the fan blades 24 can backdrive the brake actuators 42, 72. In such case, a brake means for preventing back driving of the brake actuators 42, 72 may be required. FIG. 5 depicts a solenoid brake 90 added to the bi-directional induction brake actuator 70 of FIG. 4. The solenoid brake 90 is mounted on a flange 92 attached to and extending radially from the housing 40, and it includes a ferromagnetic casing 94 and a coil 96 attached to the flange 92. The solenoid brake 90 further includes a sliding armature 98 which includes a generally disk shaped ferromagnetic element 100 and a cylindrical portion 102 attached thereto. The cylindrical portion 102 is preferably engaged by either a key or spline 110 to the tube 60 of the linkage means 58. In addition, a spring element 104 is provided to force the ferromagnetic element 100 away from the casing 94 thereby increasing the air gap of the magnetic circuit of the solenoid whenever electric power is not being delivered to the coil 96.

Spring 104 also provides the mechanical force to engage the brake function of the solenoid brake 90. When the coil 96 is not energized, the spring 104 urges the ferromagnetic element 100 into contact with a friction pad 106 attached to disk element 108 integral with said linkage means 78 and second brake rotor 76. Under this condition, the solenoid brake 90 simply locks the two brake rotors 54, 76 of the actuators 42, 72 respectively, together. The solenoid brake 90 is fail safe in that it will be "ON", i.e. interlocking the two brake rotors 54, 76, when the solenoid current is "OFF". The solenoid brake 90 is normally engaged or disengaged only when the rotational speeds of the brake rotors 54, 76 are equal; thus wear of the surfaces of the friction pad 106 is minimal.

FIG. 6 provides a simple electrical schematic of the electronic control system and electrical components of the bi-directional induction brake actuator 70 and the solenoid brake 90. Excitation for the bi-directional actuator 70 and the solenoid brake 90 is provided by an electric power producing means, such as for example a shaft driven generator 120. The generator 120 may include a permanent magnet rotor 122, three phase stator 124 of standard configuration. The generator 120 is electrically connected to a pair of inverter/converter means 126 and 128, connected in turn to the stators 52 and 74 respectively. As depicted schematically, the stators 52 and 74 each include three stator windings 132 A, B and C. The respective stator windings 132 A, B, and C are connected at a common point 133 and also electrically connected to inverter/converter means 126 (or 128) by conductors 134 A, B, and C respectively. The inverter/converter means 126 and 128 are also connected to a command controller 140 which receives various electrical signals and performs the logic analysis to control commutation of electric current to the respective windings 132 A, B, and C of the stators 52 and 74. The command controller 140 additionally receives signals such as a blade pitch command signal 142 (from the aircraft cockpit), blade position feedback 144, blade velocity 146, phase current feedback signals 148 and 152 from sensors 150 and 154 respectively associated with at least one of the phase windings 132 on each of said stator means 52, 74. The command controller 140 also receives signals or input commands from an engine management system (not shown) to select the mode of operation.

The command controller 140 performs an analysis to determine the current position of the fan blades 24, whether a blade angle change is required, and when a blade angle change is required, the command controller 140 provides commutation commands to the inverter/converter means 126 or 128 as required to allow routing of electrical current to the appropriate stator winding 132 A, B, or C in the stator means 52 or second stator means 74.

The inverter/converter means 126 and 128 are identical in design and thus only inverter/converter means 126 will be detailed. Accordingly, inverter/converter means 126 includes a rectification means for rectifying AC power into DC power, and power conversion means for commutating current to the stator windings 132, thereby providing AC power. The inverter/converter 126 also functions as a solenoid control. The rectification means includes two sets of diodes 160 and 162 for the three-phase rectification of power provided by the three-phase alternator 120. Thus the diodes 160 and 162 rectify the AC power to DC power, which is applied to conductors 161 and 163. The conductors 161 and 163 supply DC power to the power conversion means of the inverter/converter means 126, which includes a first set of three switches 164 and a second set of switches 166. The switches 164 are configured to have an input lead connected to the conductor 161 and a switched output which can be switched into electrical connection with one of the three conductors 134 A, B, or C respectively for each of the three switches 164. As detailed above, these conductors 134 A, B, and C are electrically connected to the respective phase windings 132 A, B, and C of the stator 52. The respective conductors 134 A, B, and C are also connected to the input of the respective switches 166 which in turn include outputs which may be switched into connection with the conductor 163. The switches 164 and 166 are controlled by the command controller 140, which sequences and modulates the "on" time of each of the respective switches to provide the appropriate commutation and magnitude of electric current via conductor 161 to the respective windings 134 A, B, or C. The sequencing and logic control is generally well-known in the art and therefore a detailed description and schematic is not provided. Thus, the inverter/converter 126 can provide DC power to the stator windings 132 or it can chop up the DC power to provide AC power to the stator windings 132.

The inverter/converter means 126 also includes a solenoid control which includes a switch 170 having a power input 174 connected to conductor 161. The switch 170 receives a command input 172 from the command controller 140 and provides an output directed to a conductor 176 which is electrically connected to the coil 178 of the solenoid brake 90. The coil 178 is also connected via a conductor 180 to the conductor 163 to return electrical current thereto. The above recitation of the components of the inverter/converter means 126 is provided by way of example only and other various types of rectification and power conversion means may readily be substituted by those skilled in the art.

FIGS. 7A and 7B depict in greater detail the power train between the induction brakes 242 and 272 and the blades 224. The engine housing 240 includes a primary support strut 200 which extends radially inward to a primary bearing mount pad 202 which supports the primary bearings 204. The primary bearings 204 have inner races supporting the engine shaft 256. This strut 200 is understood to be circular in nature and the primary bearings 204 are provided with a lubrication means such as an oil mist lubrication. For purposes of the present invention, the primary bearings 204 are important in that they fix the airgap of the two brake actuators 242 and 272.

Attached and extending from the strut 200 is an angular support member 206 which provides an attachment point for the stators 252 and 274 as well as for the coil portions of the solenoid brake 290. Thus, the angular support member 206, the first stator 252 and second stator 274 are all affixed to the housing 240 via the strut 200, and thereby stationary with respect to the rotating shaft 256.

The fan speed rotating group components include, in addition to the shaft 256, a bearing sleeve 212 which is spline connected to the shaft 256 and supports the internal race of bearings 266 and 268, a gear support strut 214, and a fan drive member 216 which extends radially outward from the shaft 256. The fan drive member 216 is essentially the primary power transmission link between the shaft 256 and the blades 224, and is connected to a blade attachment means 220 containing the root portion 244 of the blades 224. Each of the blades 224 is rotated by its own blade attachment means 220. The details of the blade attachment means 220 are not particularly relevant to the present invention. The blade attachment means 220 is itself fixed to the fan drive member 216 and thereby to the shaft 256.

Each of the brake actuators 242 and 272 include brake rotors 254 and 276. The brake rotors 254 and 276 are disposed radially inward, and set apart by an airgap, from the respective stators 252 and 274. Pitch change is responsive to the rotations of sleeves 260 and 278. The brake rotor 254 is connected to an essentially cylindrical sleeve 260 which is radially inwardly supported on the bearings 266 and 268 relative to the bearing sleeve 212 of the shaft 256. The sleeve 260 extends axially into the actuator and terminates in a gear 262 which drives a plurality of pinion gears 264. The pinion gears 264 are pinned to the gear support strut 214 which rotates at engine shaft speed. However, the pinion gears 264 are simply cylindrical gears having an internal bearing race and a pin shaft which is attached to the gear support strut 214. The pinion gear 264 drives a gear member 270 which in turn has a second set of gear teeth which drive a plurality of planet gears 300, and more particularly a first gear tooth set 302 thereof.

The second brake rotor 276, similar to the description above with respective to FIG. 4, is attached to a cylindrical member 278 which is supported relative to the sleeve 260 by bearings 288 and 286. The sleeve 278 extends axially into the assembly and terminates in a gear 280 which drives a second gear tooth set 304 of the planet gear 300.

The first gear tooth set 302 and second gear tooth set 304 are spaced apart and set at generally opposite axial ends of the planet gear 300. Each of the plurality of planet gears 300 itself is essentially a cylindrical member mounted on a bearing 306 to a pin 308, which pin 308 in turn is connected to a carrier 310. The carrier 310 is an annular double plate-like element which spaces the individual planet gears 300 at appropriate angular positions, and maintains positioning of the planet gears 300 with respect to both the gear member 270 and sleeve 278. The planet gear 300 is supported by, and travels on, the gear support strut 214. More particularly, the first gear tooth set 302 of the planet gear 300 is meshed with an annular gear 314 which is an integral portion of the gear support strut 214. Thus gear support strut 214 provides an annular gear 314 internal to which the plurality of planet gears 300 may rotate annularly when driven by either the sleeve 260 or the sleeve 278.

The plurality of planet gears 300 are also geared to a drive plate member 320 which includes an annular gear 322 which meshes with the second geared toothed portion 304. In more general terms, the output from the planet gear 300, which is transmitted to the drive plate member 320, is the relative motion produced by the sleeves 260 and 278. Thus the drive plate member 320 is the first element coupling the output of the planet gears 300 to the fan blades 224.

The next member in the power train is a ball screw 334 which is connected via a spline 336 to the radially outer portion of the drive plate member 320. In addition, the ball screw 334 is supported at its radially inward diameter by bearings 338 and 340 which are supported by the fan drive member 216 and the gear support strut 214 respectively. Thus, inner races of the bearings 338 and 340 rotate at shaft speeds at all times and the outer races rotate at the same speed as the ball screw 334 which is equal to the shaft speed when pitch is not being changed. The ball screw 334 is preferably a double-acting type having two oppositely cut ball screw threads 350 and 352, to balance the ball nut loads internally. A single nut ball screw could also be used. A pair of ball nuts 356 and 358, one having left-handed threads and one having right-handed threads, are positioned axially about the outer diameter of the ball screw 334. A plurality of balls 360 are contained between the ball screw threads 350 and 352 of the ball nuts 356 and 358 respectively. Thus with rotation of the ball screw 334, the ball nuts 356 and 358 will either move axially together or axially apart depending on the direction of rotation of the ball screw 334.

FIG. 8 shows the linkage between one blade 224 and the ball nuts 356 and 358. The ball nuts 356 and 358 are connected via links 366 and 368 to yokes 369 via pins 370 which attach links 366 and 368 to opposite portions of the yoke 369. Each yoke 369 also includes an internal spline 362 which provides a spline connection to the root portion 244 of an individual fan blade 224; thus translation of the ball nuts 356 and 358 causes rotation of the fan blades 224.

Referring once again to FIGS. 7A and B, the yokes 369 may also include points of attachment for linkages 372 and 374 which are themselves attached to levers 376 and 378. The levers 376 and 378 may carry counterweights 380 and 382 to balance the torques required to rotate the fan blades 224 throughout their travel against the varying centrifugal and aerodynamic torques that exist on the fan blades 224 when the fan blades 224 are rotating through their full range of pitch with the engine running. Thus, the counterweights 380, 382 are mounted to pivot about a pin having a fixed radius from the engine centerline. The centrifugal forces acting on the respective center of gravity for each of the counterweights 380, 382 varies according to the distance of the center of gravity of the counter weights from the axis of rotation of the whole fan assembly.

The ball nuts 356 and 358 are coupled to the blades 224 and are limited in their axial movements along the ball screw 334 by stops 386, 388 and 390. The axial movement of the ball nuts 356 and 358 between these stops corresponds to the full rotational stroke of the blade 224, from the lowest pitch position (idle) to the fully reversed position (thrust reverse).

The assembly of FIG. 7A also includes a solenoid brake 290. This solenoid brake 290 includes a coil 396 within a stationary ferromagnetic casing 398 and an axially slidable rotating ferromagnetic armature portion 394. The activation of the coil 396 disengages a brake means 400 which may include a plurality of axially slidable but radially keyed brake disks 402 for simultaneous rotation with sleeve 260 and brake rotor 254, and a second plurality of axially slidable but radially keyed brake disks 404 keyed to the sleeve 278 and the second brake rotor 276. These brake disks 400 and 402 are urged into engagement by disk springs 406 when the fan blade pitch is not being changed. When the coil 396 is excited, a member 408 which abuts one of the brake pads 404 is retracted, opposing the force of the springs 406.

It is understandable from the previous description, that as long as the coil 396 is not energized, the disc plates 402 and 404 are forced together by the spring 406 and the sleeves 260 and 278 are effectively locked together. The system therefore cannot move, and the blade pitch is held in a fixed position.

In order to change the pitch of the fan blades 224, it is necessary to energize coil 396, thereby allowing rotors 254 and 276 to move with respect to one another. Then, one of the stators is energized. For example, stator 252 is energized with a suitable DC excitation, causing rotor 254 to be retarded or braked with respect to the engine shaft 256. In doing so, it retards sleeve 260, drives gears 264, 270, and through planets 300, it drives the ball screw 334. The ball nuts 356 and 358 axially approach one another and the blade 224 is rotated by means of yoke 369 and links 366 and 368, which are attached to the ball nuts.

To rotate the blade 224 in the opposite direction, the same procedure is followed as described in the previous paragraph, except that stator 274 is energized with a suitable DC excitation, instead of stator 252.

When the engine is not turning, the pitch angle of the fan blades 224 can be changed by exciting one or both of the stators 252, 274 with AC power so that brake actuators 242, 272 function as contra-rotating motors. Electrical actuation power in this mode cannot be obtained from a generator on a stopped engine. Power must be obtained from some other source such as a ground power supply or an on board auxiliary power supply or battery. It should be noted that centrifugal and friction loads are low when the engine is not running so the AC power demand is relatively low.

A pitch control system to alter the fan blade pitch angle of an aircraft engine during flight of the aircraft must be intrinsically reliable and fail-safe. The differential induction brake actuation system herein is relatively simple in design because the primary actuation torque is extracted directly from the engine shaft 256 and is precisely controlled with a small amount of DC excitation power to the stator means, preferably only about two percent of the maximum power rating of the induction brake actuator means 242 and 272. A particular advantage of the system is that all bearings and gears are carried directly on and rotate with the engine drive shaft 256 during normal engine operation so that they experience relative motion only briefly when the pitch of the fan blades 224 is being changed. Thus, wear is minimized and lubrication requirements are minimal, and all bearings in the brake actuation system may be designed to have a reasonable diameter and speed.

It should be evident from the foregoing description that the present invention provides many advantages over previous fan pitch actuation systems of the art. Although preferred embodiments are specifically illustrated and described herein, it will be appreciated that many modifications and variations of the present invention are possible in light of the above teaching to those skilled in the art. It is preferred, therefore, that the present invention be limited not by the specific disclosure herein, but only by the appended claims.

We claim:

1. Apparatus for controlling variable blade pitch of a turbine engine including a turbine shaft and a plurality of fan blades, said apparatus comprising:
   a first member relatively rotatable with respect to said shaft;
   a second member relatively rotatable with respect to said shaft;
   differential gear means for interengaging with said first and second members and for providing a translational output in response to rotation of said first and second members relative to said shaft;
   linkage means for receiving said translational output of said differential gear means and for converting and transmitting said translational output to said fan blades to affect a pitch change of said fan blades;
   first actuator means for selectively causing rotation of said first member relative to said shaft and thereby effecting a pitch change of said fan blades in a first direction; and
   second actuator means for selectively causing rotation of said second member relative to said shaft and thereby effecting a pitch change of said fan blades in a direction opposite said first direction.

2. The apparatus of claim 1 wherein each said actuator means includes brake means for applying a braking force to its associated member to thereby slow rotation of its associated member with respect to said shaft.

3. The apparatus of claim 2 wherein each said brake means comprises a brake rotor secured for rotation with its associated member and a stator affixed to a housing of said engine, whereby a stator receives a DC excitation to retard rotation of its associated brake rotor.

4. The apparatus of claim 3 wherein each said brake rotor includes a squirrel cage rotor, and wherein each said stator includes multiphase windings.

5. The apparatus of claim 3 further including control means for selectively effecting a pitch change while said engine is running by exciting a selected one of said stators.

6. The apparatus of claim 3 further including control means for selectively effecting a pitch change while said engine is not running by exciting at least one of said stators with AC power; and for selectively rotating said shaft while said engine is not running by application of alternating current of like phase to both said stators to accelerate said engine toward starting speed.

7. The apparatus of claim 1 wherein said differential gear means includes:
   gear means, coupled to said shaft and responsive to said first and second members, for providing a rotational output in one direction when said first member is rotated faster than said second member and for providing a rotational output in an opposite direction when said second member is rotated faster than said first member; and
   translational means, responsive to said rotational output of said gear means, for converting said rotational output to linear motion; wherein said linkage means rotates said blades in response to said linear motion of said translational means.

8. The apparatus of claim 7 wherein said translational means comprises a ball screw assembly including an annular ball screw and an associated pair of oppositely disposed axially traveling annular ball nuts, said annular ball nuts driving said linkage means when said ball screw is rotated by said gear means.

9. The apparatus of claim 8 wherein said ball screw assembly is a double acting type.

10. The apparatus of claim 8 wherein said linkage means includes, for each blade: a yoke secured for rotation with its associated blade; first linking means for linking a first end of said yoke to one of said nuts; and second linking means for linking a second end of said yoke to the other one of said nuts.

11. The apparatus of claim 10 wherein said linkage means further includes counterweight means for balancing each said linking means.

12. A method of operating a differential electromagnetic induction fan blade pitch system having two induction motors, each said induction motor including a rotor and a stator, said method comprising the steps of;
   selectively energizing either one of the stators to alter fan blade pitch in opposite senses when the fan is rotating and a first mode of operation is selected;
   selectively energizing both of the stators simultaneously such that both rotors transmit torque to rotate the fan for assisting in starting fan rotation when a second mode of operation is selected;
   selectively energizing at least one of the stators to drive the fan to a reverse pitch position when a third mode of operation is selected whereby the rotating fan creates a reverse thrust; and
   driving both rotors by the engine during normal fan operation to generate auxiliary electrical power when a fourth mode of operation is selected.

13. Apparatus for rotating at least one output member in response to relative rotation between first and second input members, comprising;
   a planetary gear train having first and second input gears coupled to said first and second input members and having an output driven in response to relative rotation between said first and second input members;
   a drive plate member engaging said output of said planetary gear train;
   ball screw means, including a ball screw secured to said drive plate member and ball nuts threadedly engaging said ball screw and moving axially on said ball screw in response to rotation of said ball screw by said drive plate member; and
   a yoke member corresponding to each output member, each said yoke member being coupled to said ball nuts for rotating said corresponding output member when said ball nuts move axially on said ball screw.

14. The apparatus of claim 13, wherein said first and second input members are sleeves which terminate in said first and second input gears, respectively, one sleeve being disposed coaxially about the other sleeve.

15. The apparatus of claim 14, further comprising locking means for interlocking said first and second sleeves.

16. The apparatus of claim 15, wherein said locking means includes:
   a first set of disks secured for axial movement on said first sleeve;
   a second set of disks secured for axial movement on said second sleeve, said first and second disks being interleaved; and
   actuatable urging means for urging said first set of disks against said second set of disks when said first and second sleeves are to be locked together.

17. The apparatus of claim 16, wherein said actuatable means includes:

a solenoid having an armature which slides from a first position towards a second position when said solenoid is actuated;
an arm extending from said armature, towards said disks; and
spring means for pressing said arm against said disks when said armature is at said first position, whereby said first and second sleeves are interlocked, said solenoid being actuated to remove pressure on said disks, allowing said first set of disks to rotate relative to said second set of disks, whereby said first and second sleeves are unlocked.

* * * * *